United States Patent [19]
Chamberlain et al.

[11] Patent Number: 5,452,003
[45] Date of Patent: Sep. 19, 1995

[54] DUAL MODE ON-CHIP HIGH FREQUENCY OUTPUT STRUCTURE WITH PIXEL VIDEO DIFFERENCING FOR CCD IMAGE SENSORS

[75] Inventors: Savvas G. Chamberlain; William D. Washkurak, both of Waterloo, Canada

[73] Assignee: Dalsa Inc., Waterloo, Canada

[21] Appl. No.: 12,869

[22] Filed: Feb. 3, 1993

[30] Foreign Application Priority Data

Feb. 3, 1992 [CA] Canada ................... 2060556-1

[51] Int. Cl.⁶ ............................................. H04N 3/14
[52] U.S. Cl. ................... 348/294; 348/312; 257/249
[58] Field of Search ................... 348/294, 312; H04N 3/14; 257/239, 3, 241, 243, 249, 236; 377/60, 61, 62, 66

[56] References Cited

U.S. PATENT DOCUMENTS

| | | | |
|---|---|---|---|
| 4,195,273 | 3/1980 | Prince | 257/249 X |
| 4,476,568 | 10/1984 | Prince | 257/239 X |
| 4,581,652 | 4/1986 | Kinoshita et al. | 358/209 X |
| 5,012,344 | 4/1991 | Goto | 358/213.11 |
| 5,025,318 | 6/1991 | Nagura | 358/213.15 |

Primary Examiner—Wendy R. Greening
Attorney, Agent, or Firm—Jeffrey T. Imai; Arne I. Fors; D. Doak Horne

[57] ABSTRACT

A dual mode high frequency output structure for a CCD image sensor has a differencing mode for determining a difference between a charge of successive charge packets of a first pulse train outputted from a shift register of the CCD image sensor and a non-differencing mode for outputting a video signal from the shift register of the CCD image sensor. The structure comprises a first series of CCD gates, a second series of CCD gates, an output well potential, a first clock for creating and shifting a first barrier and gradient in the first series of CCD gates for transferring a charge packet from the shift register to the output well, a second clock for creating and shifting a second barrier and gradient in the second series of CCD gates for transferring the charge packet from the output well potential to an output drain, an amplifier for amplifying an output voltage from the output well potential, a pre-set clock for pre-setting the amplifier to a pre-set voltage while the charge packet is in the output well potential until the charge packet is transferred therefrom. An asynchronous pass of successive charge packets through the output well produces the output voltage at the output well which is proportional to the difference between charges of the successive charge packets. A synchronous pass of the charge packets produces the output voltage for the video signal.

20 Claims, 6 Drawing Sheets

DUAL MODE ON-CHIP HIGH FREQUENCY OUTPUT STRUCTURE WITH PIXEL VIDEO DIFFERENCING FOR CCD IMAGE SENSORS

FIELD OF INVENTION

This invention relates to a high frequency output structure for CCD image sensors.

BACKGROUND OF INVENTION

It is well known to construct a photodetector with a charge coupled device (CCD's). These types of devices are also known as charge coupled imagers (CCI's).

A CCI is constructed from arrays of transparent MOS capacitors. A bias voltage applied to a gate electrode of the MOS capacitor can be used to alter the electric potential within a depleted semiconductor substrate, directly beneath the gate electrode. Appropriate bias levels to the array of MOS capacitor structures allows the formation of "wells" and "barriers" which are used to define picture elements called pixels. When the imager is placed in the focal plane of an optical imaging system, for example, photo-generated charge can be collected in the pixels, reproducing the image in a manner analogous to exposure of film grains in photographic film. The size of the integrated charge packet associated with each picture element, or pixel, is proportional to the incident photon flux.

The use of "barriers" and "wells" is also used to transfer the charge packets within the device. At the end of an exposure cycle, the charge packets defining the electronic image is transferred out of the imaging section and to a charge sensing circuit via a shift register. This shift register is generally formed by a series of adjacent MOS capacitor structures, being termed a CCD shift register.

The detection of the signal charge within the shift register is an important aspect of the operation of CCD's. Techniques for detecting a signal charge are well known in the art and include the use of an external pre-amplifier connected to an output diode, on-chip signal charge sense and reset MOSFET's to form a gated signal charge integrator. The floating gate signal sense MOSFET measures the signal charge packet non-destructively. A full description of these techniques, including references to technical related papers, can be found in "Charge Transfer Devices" by C. H. Sequin and M. F. Tompsett (Academic Press, 1975).

Output circuits can also be used with CCD's. The circuits eliminate reset noise on the output node by correlating double sampling. An extensive description of this technique can be found in "Characterization of surface Channel CCD Image Arrays at Low Light Levels", M. H. White, et al., IEEE J. Solid State Circuits, V. Sc-9, pp. 1-13, 1974.

In a normal mode of operation, a CCD image sensor can produce a video output signal. CCD's can also perform signal processing functions, such as signal differencing. Signal differencing can produce an output voltage signal of the imager which is proportional to the difference of the signal of two adjacent pixels. In a CCD digital filter application, a differential amplifier can be used to perform signal differencing. See for example pages 201 to 235 of "Charge Transfer Devices" by C. H. Sequin and M. F. Tompsett (Academic Press, 1975).

In U.S. Pat. No. 4,639,678, a method and apparatus is described which performs a charge difference of two charge packet signals. In this device, two unknown charge packets are stored in adjacent potential wells of equal depth in a charge coupled device. The charge packets are then merged by changing the potential on an intermediate merge electrode to remove a potential barrier between the two wells. The potential barrier is then reestablished, and a current is induced through one of the electrodes which establishes the two wells of equal depth. The current is integrated as a measure of the original absolute difference between the two charge packets.

The prior art differencing techniques suffers from several problems. First, the techniques are unable to provide the difference between two consecutive charge packets in sequence. Second, the devices are unable to perform the differencing techniques at the relatively high clock rate of the CCD shift register. Third, the prior devices are unable to perform charge differencing and at the same time operate in a non-differencing mode for normal video output.

SUMMARY OF INVENTION

The disadvantages of the prior art may be overcome by providing a CCD output structure which is capable of providing, in sequence, a charge difference of the pixels and which is capable of providing normal non-differencing signals by merely changing the external clock time sequence.

It is desirable to provide a device which can carry out the charge differencing operation under one CCD gate, thereby improving the differencing accuracy.

It is still further desirable to provide a novel on-chip output CCD device structure which can be used for linear and area CCD image sensors.

It is still further desirable to provide a novel on-chip output CCD device structure which can operate in either a normal non-differencing mode or a differencing mode at any selected time by controlling an external clock pulse.

It is still further desirable to provide a novel on-chip output CCD device structure which can be integrated with either four phase, three phase, two phase or single phase CCD linear and area image sensors.

It is still further desirable to provide a novel on-chip output CCD device structure which can operate at the same clock speed as the CCD image sensor to maintain the frequency bandwidth of the video signal.

It is still further desirable to provide a novel on-chip output CCD device structure which can operate at relatively high frequencies to maintain dynamic range and accuracy, in particular, can operate in the range of 500 KHz to 25 MHz.

According to one aspect of the invention, there is provided a dual mode high frequency output structure for a CCD image sensor. The structure has a differencing mode for determining a difference between a charge of successive charge packets of a first pulse train outputted from a shift register of the CCD image sensor and a non-differencing mode for outputting a video signal from the shift register of the CCD image sensor. The structure comprises a first series of CCD gates,
a second series of CCD gates,
an output well potential,
a first means for creating and shifting a first barrier and gradient in the first series of CCD gates for transferring a charge packet from the shift register to the output well, a second means for creating and shifting a second barrier and gradient in the second series of CCD gates for transferring the charge packet from the output well potential to an output drain, an amplifier means for amplifying an output voltage from the output well potential, a pre-set means for pre-setting the amplifier means to a pre-set voltage while the charge packet is in the output well potential until the charge packet is transferred therefrom. An asynchronous pass of successive charge packets through the output well produces the output voltage at the output well which is proportional to the difference between charges of the successive charge packets. A synchronous pass of the charge packets produces the output voltage for the video signal.

According to another aspect of the invention, there is provided a dual mode high frequency output structure comprising a first clock means for producing a first biasing signal having one of a plurality of periods, a second clock means for producing a second biasing signal having a second period, a third clock means for producing a third biasing signal having a third period, a first CCD gate connected to a second CCD gate and responsive to said first biasing signal, said second CCD gate having a well potential greater than said first CCD gate, a third CCD gate having means for biasing said third CCD gate to form a constant potential barrier adjacent said second CCD gate, a fourth CCD gate adjacent said third CCD gate and biased as an output well potential, a fifth CCD gate adjacent said fourth CCD gate and connected to a sixth CCD gate and responsive to said third biasing signal, said sixth gate having a well potential greater than said fifth gate, a seventh CCD gate adjacent said sixth CCD gate and biased to form a constant potential barrier, an output drain adjacent to said seventh CCD gate for receiving said charge packets an amplifier means connected to said fourth CCD gate and adapted to amplify an output voltage therefrom, and a switch responsive to said third biasing signal and connected between a preset bias voltage and said amplifier. When the structure is in a differencing mode, the first biasing signal biases the first gate to present a barrier to each of the consecutive charge packets and then presents a gradient to each of the consecutive charge packets for transferring the charge packets to the second gate and the reestablishes the barrier for transferring the charge packet to the third gate. The second biasing signal, which is asynchronous with the first biasing signal, biases the fifth gate to present a barrier to each of the charge packets while in the fourth CCD gate and presents a gradient to the charge packet for transferring the charge packet to the seventh gate. The third biasing signal pre-sets the fourth CCD gate to and disconnects from the pre-set voltage while each of the charge packets is in the fourth CCD gate.

According to still yet another aspect of the invention, there is provided a method for determining a difference between successive charge packets outputted from a shift register of the CCD image sensor comprising a well potential bounded by a first series of CCD gates and a second series of CCD gates, and an amplifier. The steps comprise, a. creating a first barrier and a gradient in the first series of CCD gates, the gradient in a direction from the first barrier to the output well potential and creating a second barrier presenting a second gradient in the second series of CCD gates in a direction from the well potential to an output drain, b. transferring a charge packet having a first charge from the shift register to the well potential by shifting the first barrier and gradient, c. pre-setting an input voltage to the amplifier while the charge packet is in the well potential, d. transferring a successor charge packet having a second charge from the shift register towards the well potential by shifting the first barrier and gradient, e. transferring the charge packet from the well potential to the output drain by shifting the second barrier and gradient, thereby producing a first voltage proportional to the charge packet for inputting to the amplifier, f. transferring the successor charge packet to the well potential by shifting the first barrier and gradient, thereby producing a second voltage for inputting to the amplifier. An output voltage from the amplifier is proportional to the difference between the charge of the second charge packet with respect to the charge of the first charge packet.

DETAILED DESCRIPTION OF THE DRAWINGS

In drawings which illustrate embodiments of the invention.

DETAILED DESCRIPTION OF THE INVENTION

Figure 1:
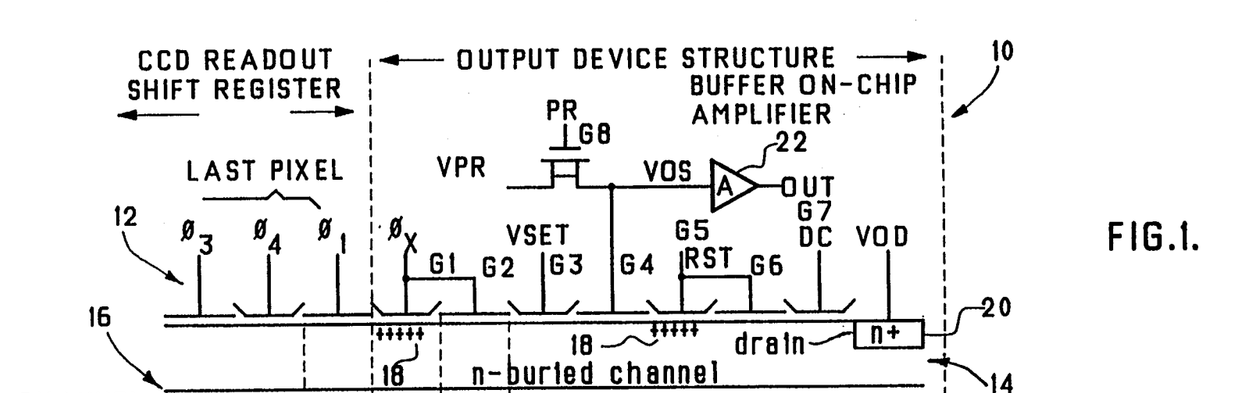
FIG. 1 is a schematic sectional view of the output section of the CCD image sensor of the present invention having a duty cycle of 50%.

With reference to FIG. 1, the output structure according to the present invention is generally illustrated as 10. The structure 10 is electrically connected to a last pixel of a CCD shift register 12. In the preferred embodiment, both CCD shift register 12 and output structure 10 are manufactured on the same chip.

The chip comprises a semi-conductor substrate 14 having an n-buried channel 16. The output structure 10 comprises 7 CCD gate electrodes G1 to G7 electrically connected and positioned above the n-buried channel as illustrated schematically in FIG. 1. Gates G1 and G5 are different from the other CCD gates in that a boron ion barrier 18 is implanted at the surface of the silicon n-buried channel region. The boron ion implants allows the output structure to operate without the need for high clock voltages at two different levels.

Gates G1 and G2 are connected together as illustrated. By ganging gates G1 and G2 and having a boron ion barrier 18, gate G2 will always be at higher well potential than gate G1. A barrier and a well potential presenting a gradient is thus established. Similarly, gates G5 and G6 are ganged together in a like fashion.

Gate G3 has an output node set voltage VSET applied thereto. VSET is a low current DC gate bias which controls the transfer of signal onto the output sensing diffusion. Gate G4 is connected to the output $V_{os}$. Gates G5 and G6 are connected together. A DC potential is applied to gate G7. At the end of the output structure 10 is an output drain 20 at OD to which an output drain bias voltage VOD is applied.

The output voltage $V_{os}$ from gate G4 is applied to a buffer on-chip amplifier 22 having a gain A. A typical on-chip amplifier is a single or double stage source follower. The amplifier 22 has a high impedance input to a low impedance output.

A MOSFET transistor MPR is connected to the input of amplifier 22 and an input voltage VPR. This MOSFET MPR is used as a pre-set switch controlled by the voltage PR. Gate G8 is positioned above MOSFET MPR. A voltage PR from a pre-set clock is applied to gate G8. A pixel reset bias voltage VPR is applied to MOSFET MPR. VPR is a high impedance DC bias used to reset the photoelements.

When PR goes high, it establishes a reference voltage $V_{os}$ which will equal VPR. When PR goes low, this allows $V_{os}$ to float in relation to the charge packet under gate G4. When a charge packet is transferred out, $V_{os}$ changes by the amount of charge in the charge packet. When a successor charge packet is transferred into the well potential under gate G4, the charge will change $V_{os}$ by the amount of charge in the successor charge packet. When the successor charge is transferred out, the output voltage $V_{os}$ is equal to the difference between the charge packet and the successor charge packet.

A voltage RST from a reset clock is applied to gates G5 and G6. A DC voltage VSET is applied to gate G3.

Figure 3:
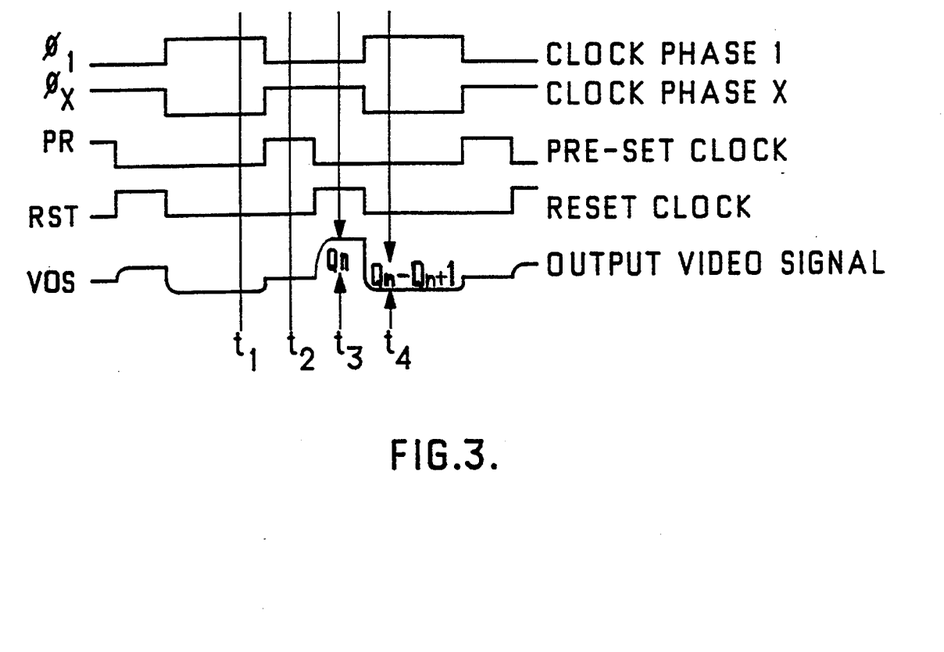
FIG. 3 is a time phase diagram of the CCD image sensor of the embodiment of FIG. 1.

The potential of each waveform $\phi 1$, $\phi x$, PR, RST and $V_{os}$ is illustrated in FIG. 3. As is apparent, $\phi 1$ is the inversion of $\phi x$ having equal periods. PR is in the same phase as $\phi x$ but is on for only half of the on phase of $\phi x$. At other times, PR remains off. Reset clock RST is in the same phase as $\phi x$ but is on for only half of the on phase of $\phi x$, the half where PR is off.

In the differencing mode, VSET will bias gate G3 into an enable mode. At time $t_1$, $\phi 1$ is on, $\phi x$ is off presenting a barrier to charge packet $Q_{n+1}$, a gradient at gates G2, G3 and a potential well at G4. RST is off presenting a barrier at G5 and a gradient at gates G6 and G7. Charge packet $Q_n$ sits within the well at G4.

Figure 7:
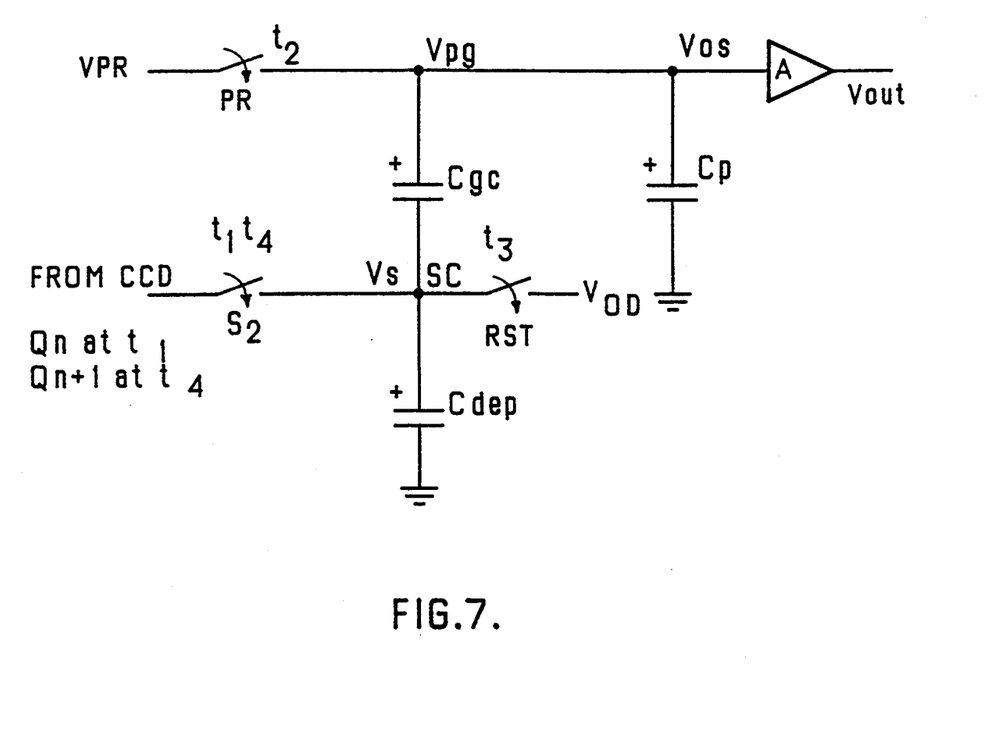
FIG. 7 is a schematic view of an equivalent circuit of the embodiment of FIG. 1.

The equivalent circuit at the output gate G4 is illustrated in FIG. 7.

With reference to FIG. 7, node BC corresponds to the CCD maximum channel potential. $V_s$ indicates the channel potential maximum. Capacitance $C_{gc}$ is the gate oxide capacitance. The capacitance $C_{dep}$ is the capacitance which exists between the channel potential maximum point and the silicon substrate. The capacitance $C_p$ is made up from the bus capacitance plus the input capacitance of the buffer on-chip amplifier 22.

Figure 8:
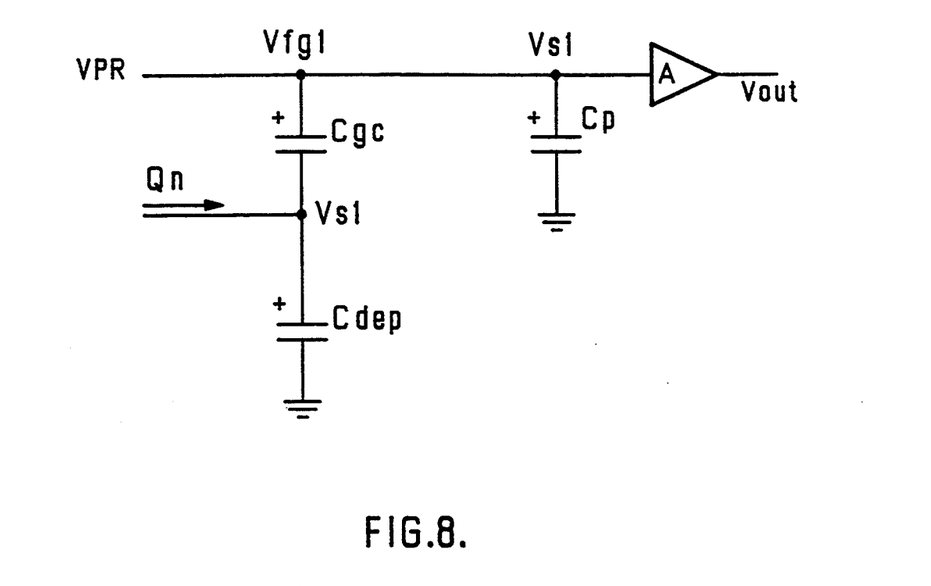
FIG. 8 is a schematic view of an equivalent circuit of the embodiment of FIG. 1.

Referring to FIG. 3, at time $t_2$, $\phi x$ is on at the same time PR is on and $\phi 1$ and RST are off. A potential well is created under gate G2 while the potential well under gate G4 remains stationary. Charge packet $Q_{n+1}$ will pass to the potential well under gate G2. The equivalent circuit at the output gate G4 is illustrated in FIG. 8. At time $t_2$, the following relations will apply:

$$V_{fg1} = VPR \qquad (1)$$

$$V_{out} = A \times V_{s1} \qquad (2)$$

$$V_{s1} = Q_n / \{C_{dep} \Pi C_{gc}\} \qquad (3)$$

Figure 9:
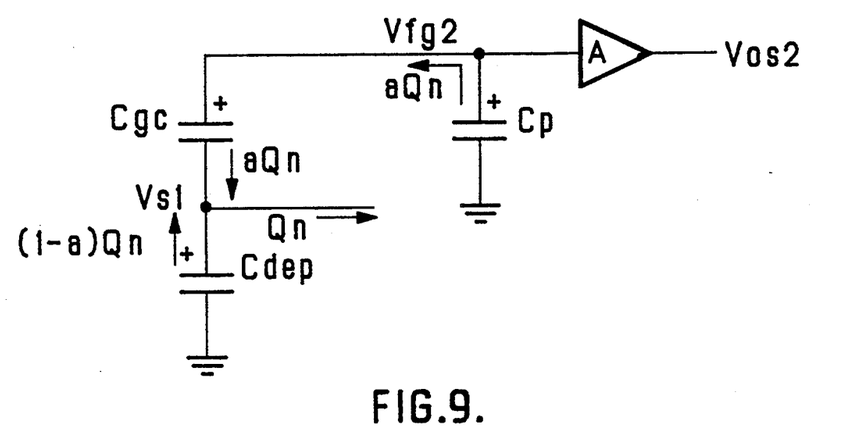
FIG. 9 is a schematic view of an equivalent circuit of the embodiment of FIG. 1 at time $t_3$.

At time $t_3$, $\phi x$ is on at the same time RST is on and $\phi 1$ and PR are off. A potential well remains under gate G2, while the potential well under gate G4 shifts under gate G6. Charge packet $Q_{n+1}$ will remains under gate G2 and charge packet $Q_n$ shifts to the well under gate G6. The equivalent circuit at the output gate G4 is illustrated in FIG. 9. At time $t_3$, the following relations will apply:

$$V_{fg2} - V_{fg1} = Q_n / C_{eff} \qquad (4)$$

$$\text{where } C_{eff} = C_{dep} + C_p + C_p C_{dep} / C_{gc} \qquad (5)$$

$$V_{os2} - V_{os1} = A\{Q_n / C_{eff}\} \qquad (6)$$

$$\therefore V_{os2} = A\{Q_n / C_{eff} + VPR\} \qquad (7)$$

Figure 10:
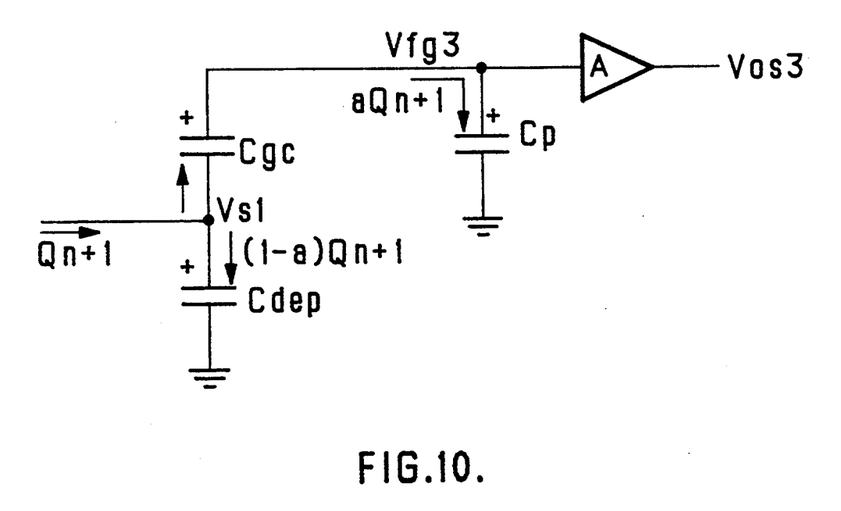
FIG. 10 is a schematic view of an equivalent circuit of the embodiment of FIG. 1 at time $t_4$.
Figure 11:
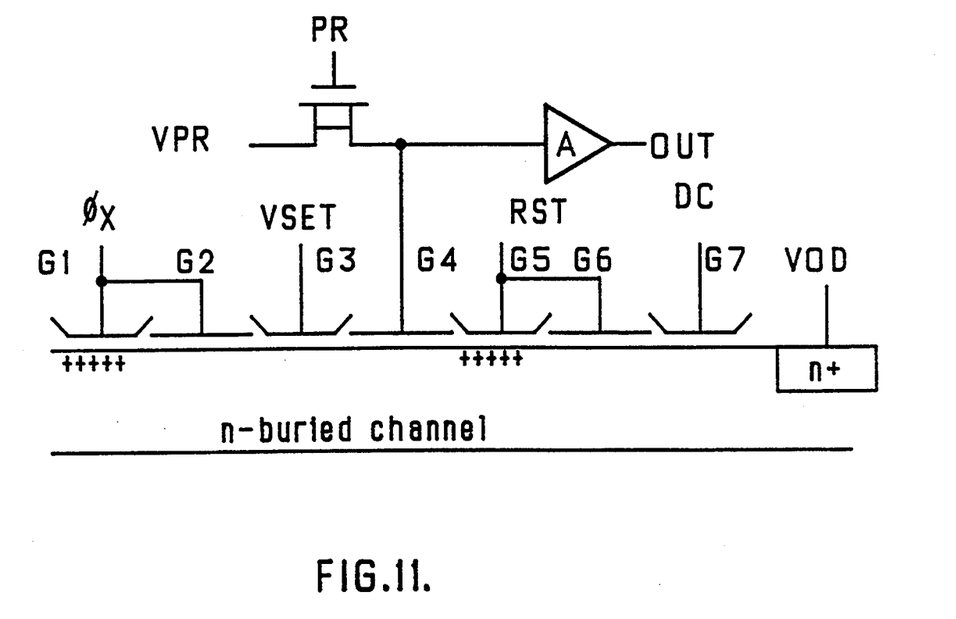
FIG. 11 is a schematic sectional view of the embodiment of FIG. 1 operating as a normal non-differencing output.

Note that in FIGS. 9 and 10:

$$a = \{1/C_{dep}\}\{C_{dep} \Pi C_{gc} \Pi C_p\} \qquad (8)$$

At time $t_4$, is on, $\phi x$ is off presenting a barrier to charge packet $Q_{n+1}$, and a gradient at gates G2, G3 and a potential well at G4. RST is off presenting a barrier at G5 and a gradient at gates G6 and G7. Charge packet $Q_n$ has transferred to the drain, while $Q_{n+1}$ sits within the well at G4 causing the channel potential to decrease, thereby decreasing $V_{os4}$. The voltage $V_{os3}$ relative to the reference voltage is the voltage signal difference of charge packets $Q_n$ and $Q_{n+1}$, irrespective of whether $Q_n$ is greater or less than $Q_{n+1}$. The equivalent circuit at the output gate G4 is illustrated in FIG. 10. At time $t_4$, the following relations will apply:

$$V_{fg3} - V_{fg2} = -Q_{n+1} / C_{eff} \qquad (9)$$

$$V_{os3} - V_{os2} = A\{-Q_{n+1} / C_{eff}\} \qquad (10)$$

$$\therefore V_{os2} = A\{Q_n / C_{eff} + VPR\} \qquad (7)$$

$$\therefore V_{os3} = A\{(Q_n - Q_{n+1}) / C_{eff} + VPR\} \qquad (11)$$

It is apparent that the difference between consecutive charge packets is proportional to the output voltage $V_{os3}$.

The process is repeated for each successive charge packet in a similar fashion to produce a series of voltages which is proportional to the difference between successive charge packets.

In the preferred embodiment, the output structure of the present invention can operate in the range of between 500 KHz and 25 MHz.

Figure 2:
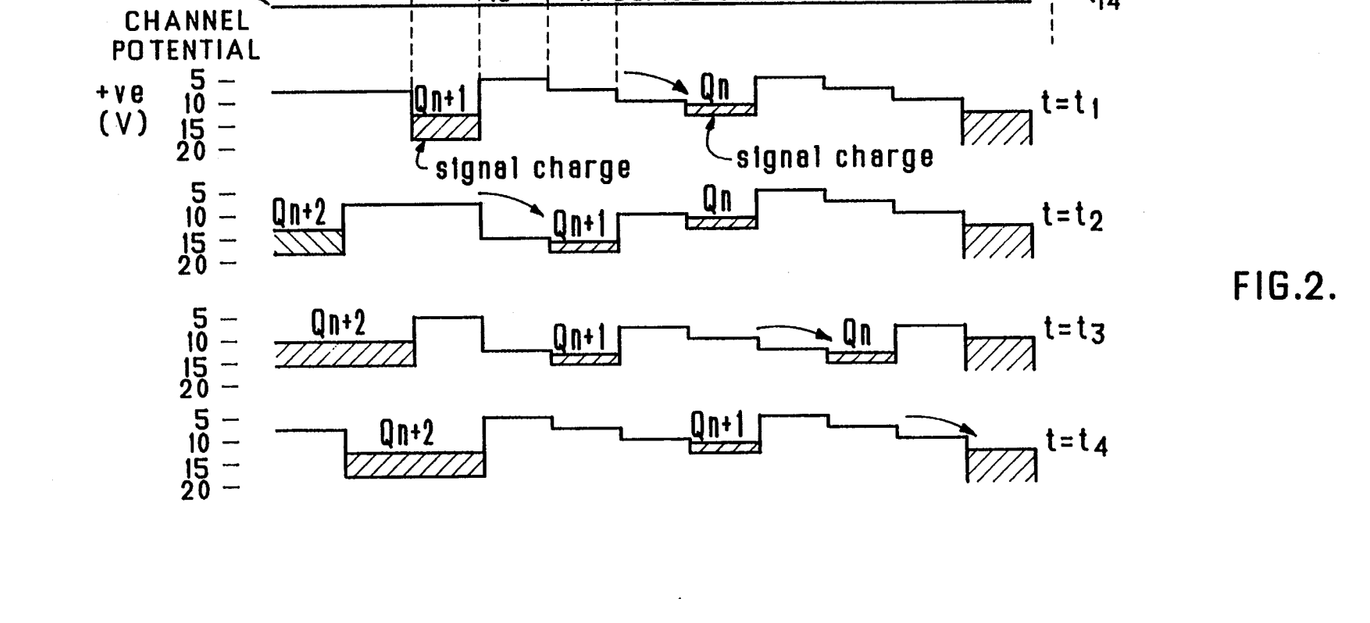
FIG. 2 is a potential diagram of the CCD image sensor of the embodiment of FIG. 1.
Figures 4, 5:
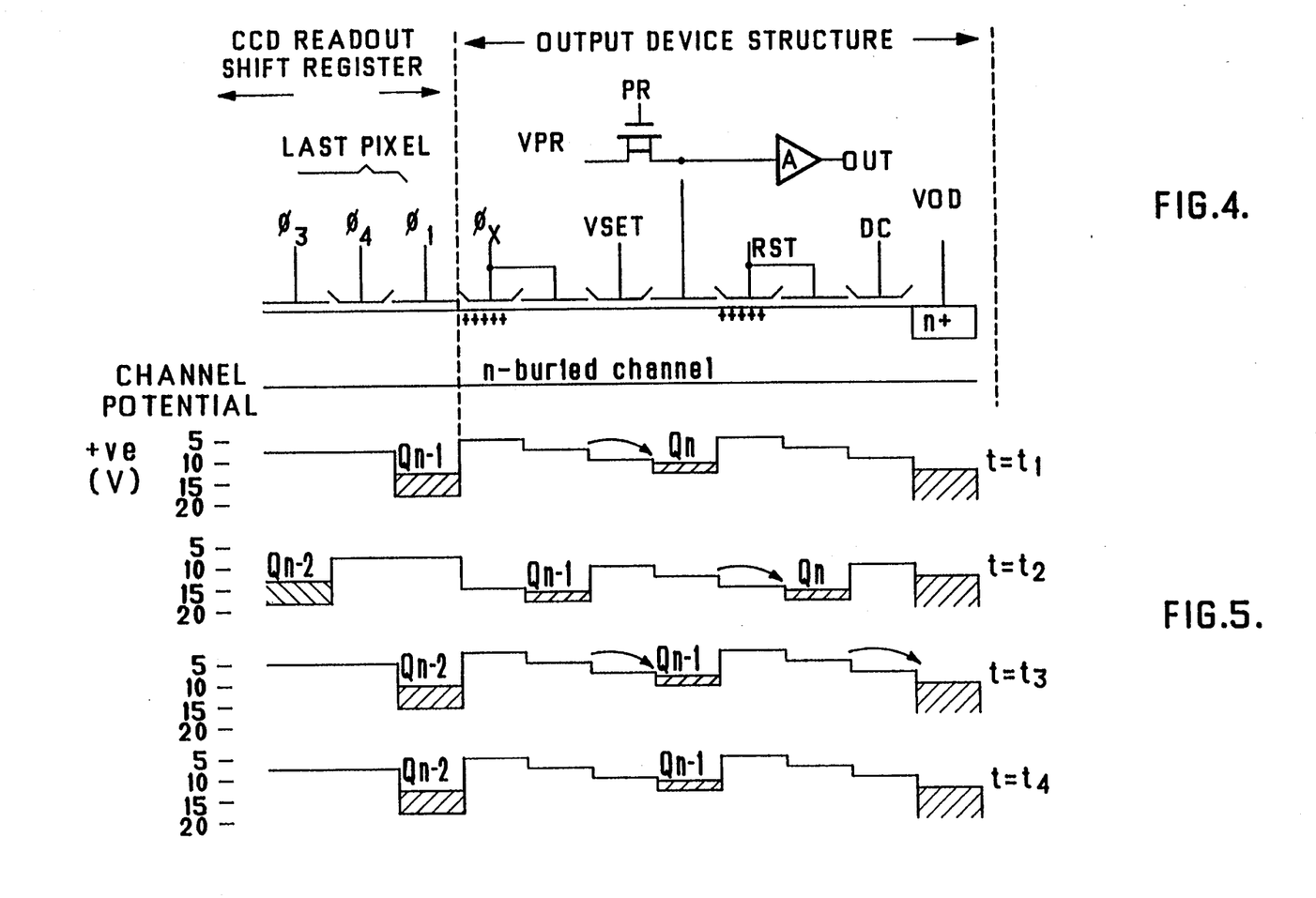
FIG. 4 is a schematic sectional view of the output section of the CCD image sensor of the present invention having a duty cycle of 30%.
FIG. 5 is a potential diagram of the CCD image sensor of the embodiment of FIG. 4.
Figure 6:
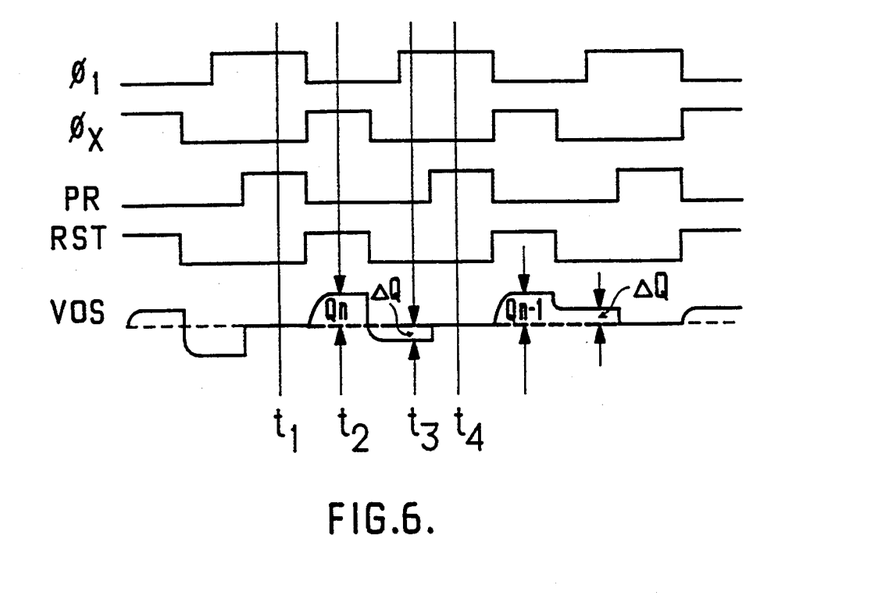
FIG. 6 is a time phase diagram of the CCD image sensor of the embodiment of FIG. 4.

In the embodiment of FIGS. 1 to 3, a 50% duty cycle has been used. However, a 30% duty may be used with equally satisfactory results. A 30% duty cycle is illustrated in FIGS. 4 to 6.

Figure 12:
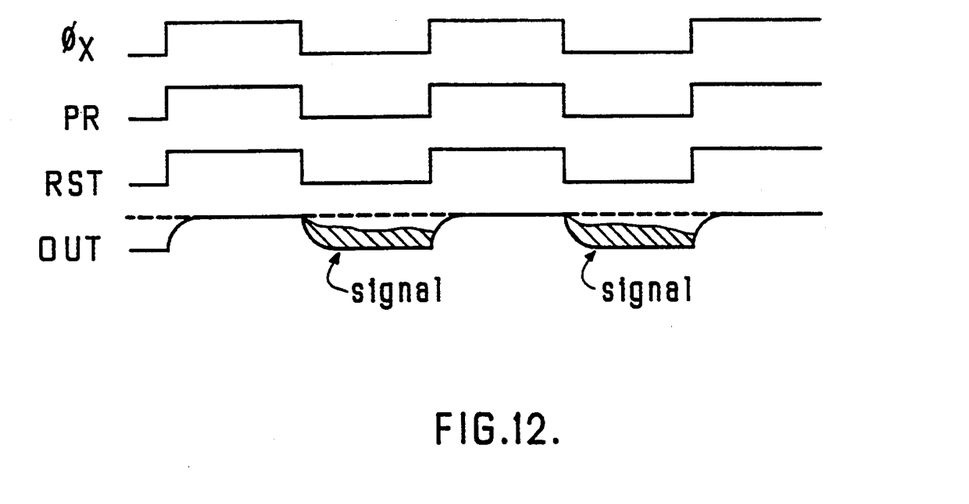
FIG. 12 is a time phase diagram of the CCD image sensor of the embodiment of FIG. 11.

To operate the output structure of the present invention in a normal non-differencing mode, the clock waveforms and the relative timing is modified as illustrated in FIG. 12. As is apparent, φx, PR and RST have the same period and operate fully synchronously to transfer the charge packets for a normal video output.

It is now apparent to a person skilled in the art that many modifications could be made to the present invention upon perusal of the foregoing description. It is to be understood that certain changes in style, size and components may be effective without a departure from the spirit of the invention and within the scope of the appended claims.

We claim:

1. A dual mode high frequency output structure for a CCD image sensor, said structure having a differencing mode for determining a difference between successive charge packets outputted from a shift register of the CCD image sensor and a non-differencing mode for outputting said successive. Charge packets as a video signal, said structure comprising
   a first series of CCD gates,
   a second series of CCD gates,
   an output well potential,
   a first means for creating potential barrier and gradient in said first series of CCD gates for transferring successive charge packets from the shift register to said output well potential,
   a second means for creating a second potential barrier and gradient in said second series of CCD gates for transferring said successive charge packets from the output well potential to an output drain,
   an amplifier means connected to said output well potential for amplifying an output voltage therefrom,
   a pre-set means for pre-setting said amplifier means to a pre-set voltage and floating said output well potential while each of said successive charge packets is in said output well potential until said charge packet is transferred therefrom,
   whereby during an asynchronous pass of successive charge packets through said output well potential, said output voltage at said output well potential is proportional to the difference between charges of said successive charge packets and whereby during a synchronous pass of said successive charge packets through said output well potential, said output voltage is proportional to said video signal.

2. A dual mode high frequency output structure as claimed in claim 1 wherein said structure further comprises a means for switching modes of said structure.

3. A dual mode high frequency output structure as claimed in claim 2 wherein said first series of CCD gates comprises a first gate, a second gate and a third gate, said first gate connected to said second gate, said second gate having a well potential greater than the first gate, said third gate biased to transfer a charge from said second gate, said output well potential is a fourth gate and said second series of CCD gates comprises a fifth gate, a sixth gate and a seventh gate, said fifth gate connected to said sixth gate, said sixth gate having a well potential greater than the fifth gate, and said seventh gate biased to transfer a charge from said sixth gate.

4. A dual mode high frequency output structure as claimed in claim 3 wherein said third gate has means for isolating the output well potential from said first and second gate and said seventh gate each has a means for isolating the output drain from said fifth and sixth gates.

5. A dual mode high frequency output structure as claimed in claim 4 wherein said first means for creating a first potential barrier and gradient is a first biasing signal, said first biasing signal for biasing said first gate to present a barrier to each of said charge packets and then biasing said first gate to present a gradient to said charge packet for transferring said charge packet to said second gate and then biasing said first gate to re-establish said barrier and transferring said charge packet across said third gate and said second means for creating a second potential barrier and gradient is a second biasing signal, said second biasing signal for biasing said fifth gate to present a barrier to each of said charge packets and then biasing said fifth gate to present a gradient to said charge packet for transferring said charge packet to said sixth gate and then biasing said fifth gate to re-establish said barrier and transferring said charge packet across said seventh gate into said output drain 6. A dual mode high frequency output structure as claimed in claim 5 wherein said successive charge packets are shifted from said shift registry at a first frequency and said first and second biasing signals each has a cycle which is between 30 to 50% of a cycle of said first frequency.

7. A dual mode high frequency output structure as claimed in claim 6 wherein said output structure is manufactured on a semi-conductor substrate.

8. A dual mode high frequency output structure as claimed in claim 7 wherein said CCD image sensor is manufactured on the semi-conductor substrate adjacent said output structure.

9. A dual mode high frequency output structure as claimed in claim 8 wherein said semi-conductor substrate has an n-buffed channel.

10. A dual mode high frequency output structure as claimed in claim 9 wherein said first and second series of CCD gates are positioned above said n-buried channel and said first and fifth gates each has a boron ion barrier at an upper surface of said n-buried channel.

11. A dual mode high frequency output structure as claimed in claim 10 wherein said structure operates in the range of 500 KHz to 25 MHz.

12. A dual mode high frequency output structure for a CCD image sensor, said structure having a differencing mode for determining a difference between consecutive charge packets being outputted from a shift register of the CCD image sensor and a non-differencing mode for outputting a video signal from the shift register of the CCD image sensor, said structure comprising
   a first clock means for producing a first biasing signal having one of a plurality of periods,
   a second clock means for producing a second biasing signal having a second period,
   a third clock means for producing a third biasing signal having a third period, a first CCD gate connected to a second CCD gate and responsive to said first biasing signal, said second CCD gate having a well potential greater than said first CCD gate, a third CCD gate having means for biasing said third CCD gate to form a constant potential barrier adjacent said second CCD gate, a fourth CCD gate adjacent said third CCD gate and biased as an output well potential, a fifth CCD gate adjacent said fourth CCD gate and connected to a sixth CCD gate and responsive to said third biasing signal, said sixth gate having a well potential greater than said fifth CCD gate, a seventh CCD gate adjacent said sixth CCD gate and biased to form a constant potential barrier, an output drain adjacent to said seventh CCD gate for receiving said charge packets, an amplifier means connected to said fourth CCD gate and adapted to amplify an output voltage therefrom, and a switch responsive to said third biasing signal and connected between a preset bias voltage and said amplifier, whereby when said structure is in said differencing mode, said first biasing signal biases said first gate to present a barrier to each of said consecutive charge packets and then to present a gradient to each of said consecutive charge packets for transferring said charge packets to said second gate and then biases to re-establish said barrier for transferring said charge packet to said third gate and said second biasing signal, being asynchronous with said first biasing signal, biases said fifth gate to present a barrier to each of said charge packets while in said fourth CCD gate and presents a gradient to said charge packet for transferring said charge packet to said seventh gate and said third biasing signal pre-sets said fourth CCD gate to and disconnects from said pre-set voltage while each of said charge packets is in said fourth CCD gate.

13. A dual mode high frequency output structure as claimed in claim 12 wherein said cycle of a first and second clock means is between 30 to 50% of a cycle at which said charge packets are shifted from said shift registry.

14. A dual mode high frequency output structure as claimed in claim 13 wherein said output structure is made of a semi-conductor substrate.

15. A dual mode high frequency output structure as claimed in claim 14 wherein said CCD image sensor is adjacent said output structure.

16. A dual mode high frequency output structure as claimed claim 15 wherein said semi-conductor substrate has an n-buried channel.

17. A dual mode high frequency output structure as claimed in claim 16 wherein said first gate and said fifth gate each has an boron ion barrier at an upper surface of said n-buried channel.

18. A dual mode high frequency output structure as claimed in claim 17 wherein said structure operates in the range of 500 KHz to 25 MHz.

19. A method for determining a difference between successive charge packets outputted from a shift register of a CCD image sensor comprising a first series of CCD gates adjacent an output well potential adjacent a second series of CCD gates, and an amplifier connected to said output well potential, the steps comprising, a. creating a first potential barrier and a gradient in said first series of CCD gates, said gradient in a direction from the first barrier to the output well potential and creating a second potential barrier and gradient presenting a second gradient in said second series of CCD gates in a direction from the output well potential to an output drain, b. transferring a charge packet from said shift register to said output well potential by shifting said first potential barrier and gradient, c. pre-setting an input voltage to said amplifier and disconnecting said input voltage from said amplifier while said charge packet is in said output well potential, d. transferring a successor charge packet from said shift register towards said well potential by shifting said first potential barrier and gradient, e. transferring said charge packet from said well potential to said output drain by shifting said second potential barrier and gradient, thereby producing a first voltage proportional to said charge packet for inputting to said amplifier, f. transferring said successor charge packet to said well potential by shifting said first potential barrier and gradient, thereby producing a second voltage for inputting to said amplifier, said transferring of said successor charge pocket being asynchronous with transferring of said charge packet, whereby an output voltage from said amplifier is proportional to a difference between the charge of the successor charge packet with respect to the charge of the charge packet.

20. The method as claimed in claim 19 wherein steps c. to f. of said method are repeated for successive charge packets.

* * * * *